United States Patent
Baumgartner

(10) Patent No.: US 9,657,846 B2
(45) Date of Patent: May 23, 2017

(54) DIE CASTING MOLD EVACUATION VALVE ASSEMBLY

(71) Applicant: Fondarex S.A., St-Legier (CH)

(72) Inventor: Konrad Baumgartner, Muenster (CH)

(73) Assignee: Fondarex S.A., ST-Legier (CH)

( * ) Notice: Subject to any disclaimer, the term of this patent is extended or adjusted under 35 U.S.C. 154(b) by 221 days.

(21) Appl. No.: 14/679,500

(22) Filed: Apr. 6, 2015

(65) Prior Publication Data

US 2016/0131263 A1    May 12, 2016

(30) Foreign Application Priority Data

Nov. 7, 2014   (CH) ..................................... 1730/14

(51) Int. Cl.

| | |
|---|---|
| *B22D 17/20* | (2006.01) |
| *F16K 1/32* | (2006.01) |
| *B22D 45/00* | (2006.01) |
| *F16K 27/02* | (2006.01) |
| *F16K 31/122* | (2006.01) |
| *B22D 17/14* | (2006.01) |

(52) U.S. Cl.
CPC .............. *F16K 1/32* (2013.01); *B22D 17/145* (2013.01); *B22D 45/005* (2013.01); *F16K 27/02* (2013.01); *F16K 31/1221* (2013.01)

(58) Field of Classification Search
CPC ...... B22D 17/145; B22D 17/20; B22D 17/22; B22D 45/005; B22C 9/067
USPC ................................................. 164/305, 410
See application file for complete search history.

(56) References Cited

U.S. PATENT DOCUMENTS

| | | | | |
|---|---|---|---|---|
| 4,538,666 A | * | 9/1985 | Takeshima et al. .... | B22C 9/067 164/305 |
| 4,787,436 A | * | 11/1988 | Ozeki et al. ......... | B22D 17/145 164/305 |
| 4,995,445 A | * | 2/1991 | Shigyo ................. | B22D 17/145 164/305 |
| 5,683,730 A | * | 11/1997 | Katsumata et al. ... | B22D 17/14 164/305 |
| 8,899,302 B2 | * | 12/2014 | Bhola .................... | B22C 9/067 164/305 |
| 2003/0056931 A1 | * | 3/2003 | Wuthrich ............. | B22D 17/145 164/305 |
| 2004/0226679 A1 | * | 11/2004 | Uebayashi et al. .. | B22D 17/145 164/305 |

* cited by examiner

*Primary Examiner* — Kevin P Kerns

(74) *Attorney, Agent, or Firm* — Maginot, Moore & Beck, LLP

(57) ABSTRACT

A die casting mold evacuation valve assembly features a two-part valve casing. Machined in the front casing part is an evacuation duct closable by an evacuation valve. Housed in the casing is an actuator for actuating a valve piston of the evacuation valve. The actuator includes a casting material actuated force transducer and a force transmission member for transmitting the closing movement of the force transducer to the valve piston of the evacuation valve. The actuator features in addition a stacked spring assembly for returning the actuator and/or force ejecting the riser. The front casing part is provided with a sleeve surrounding at least a head part of the valve piston and/or a further sleeve surrounding at least the head part of the force transducer. Both sleeves are harder than the front casing part.

16 Claims, 3 Drawing Sheets

DIE CASTING MOLD EVACUATION VALVE ASSEMBLY

REFERENCE TO RELATED APPLICATION AND PRIORITY CLAIM

This application claims priority to co-pending Swiss patent application No. 01730/14, filed on Nov. 7, 2014, the entire disclosure of which is incorporated herein by reference.

BACKGROUND

The present disclosure relates to a the casting mold evacuation valve assembly.

To permit reliably preventing air or gas pockets in the finished casting, the mold or its cavities are automatically evacuated during casting. To do this, not only the air existing in the cavities of the casting mass and the mold must be able to escape, but in addition it must also be assured that also the gases emerging from the casting mass can escape.

The problematics in evacuating die casting molds involve preventing under all circumstances that the molten casting mass is able to escape into the environment. To prevent this happening, valve assemblies are employed which are provided with an evacuation duct connected to the mold cavity of the die casting mold, an evacuation valve arranged in the evacuation duct and an actuator for closing the evacuation valve. Valve assemblies are known designed for pilot control and by the casting material. The latter feature an actuator comprising a force transducer actuated by the casting material and a member for transferring the force of the closing member from the force transducer to the evacuation valve. One such valve assembly is known from EP 0 612 573 A2. Although such a valve assembly is very reliable in operation in thus achieving a very fast closing response, being able to adapt the valve assembly more specifically to the requirements at locations subject to high stress and strain remains desirable.

The object of the invention is to provide a valve assembly for evacuating die casting molds which although hardwearing is nevertheless still relatively cost-effective in production.

SUMMARY

This object is achieved by a valve assembly in which the front casing part is provided with a sleeve surrounding at least the head part of the valve piston and/or a further sleeve surrounding at least the head part of a force transducer, each sleeve being harder than the front casing part.

Now, because the front casing part is provided with a first sleeve surrounding the header part of the valve piston and/or a further sleeve surrounding at least the header part of the force transducer, whereby each sleeve is harder than the front casing part, the casing is reinforced specifically at locations subject to high stress and strain.

Thus, in one preferred further embodiment it is provided for that each sleeve is inserted in a hole drilled in the front casing part, each hole having a diminished diameter in the direction of the rear casing part, the transition from the larger to the small diameter forming a step for coming into contact with each sleeve with a heel corresponding to the step. By means of such a configuration each sleeve is exactly positioned on the one hand axially. This additionally ensures that each sleeve is not displaced even when subjected to very high forces as occur in die casting.

In another preferred further embodiment the header part of the force transducer is configured cylindrical, the end face of the header part translating sharp edged into the shell surface area. This configuration is intended to ensure that no metal debris becomes clogged between the header part of the force transducer and the inner surface of each sleeve.

Preferably, the valve piston of the evacuation valve too, features at the front end a cylindrical header part, the end face of the header part translating sharp edged into its shell surface area. This too, is intended to ensure that no metal debris becomes clogged between the header part of the valve piston and the inner surface of the corresponding sleeve.

In still another preferred further embodiment both the sleeve(s) as well as the evacuation duct are arranged in the front casing part. This configuration has the advantage of permitting rational cost-effective production.

In again another preferred further embodiment the actuator features a follower disposed between the stacked spring assembly and a collar of the force transducer. Providing a follower as part of the actuator has a proven record of success, especially where high stress and strain are involved.

By providing the actuator with a moving pressure plate mounting the stacked spring assembly for returning the actuator and/or ejecting the riser also enables this part to be specifically adapted to handle the high demands as to wear and tear.

In still another preferred further embodiment the actuator features a pneumatic closing member comprising a working piston accommodated in a hole drilled in the casing to which an inlet nozzle comprising a central air outlet and, surrounding the air outlet, a sealing member which by its end face comes into contact with the working piston in the closing position. This arrangement ensures that in the front closing position the working piston comes into contact with the inlet nozzle in the front closing position even if it were to be accommodated, for example, somewhat skew in the drilled hole.

In a further preferred further embodiment the force transducer in addition to the cylindrical header part features at least two further cylindrical portions, both of which are guided in the sleeve. The advantage of such a configuration is that the force transducer is guided by its header part very accurately in the sleeve. Also, these guide portions subjected to high stress and strain can be exactly adapted to the sleeve.

Preferably, the end face of the valve piston and/or of the force transducer when retracted projects by 0.01 to 1 mm from the end face of the corresponding sleeve facing the front face of the casing. Such a configuration has a proven record of success especially as regards ejecting the riser by the force transducer or valve piston respectively, especially since the casting material in this configuration cannot gain access into the sleeve assigned to the force transducer or valve piston respectively.

In another further preferred further embodiment of the valve assembly the sleeve serving to guide the valve piston is provided with a radial drilled hole via which the interior of the sleeve is connected to the outlet duct and the valve piston comprises two guide portions, the one of which is arranged upstream of the radial drilled hole and the other one downstream of the radial drilled hole and wherein the guide portion arranged upstream of the radial drilled hole features axial ports. This configuration enables any gas to be exhausted via the valve piston.

Preferably, the working stroke of the force transducer is limited to less than 2 mm so that the kinetic energy transmitted by the molten casting material to the force transducer or the actuator as a whole is maintained within acceptable limits.

In yet another preferred further embodiment of the valve assembly it is provided for that the working stroke of the valve piston corresponds to at least 3-times the working stroke of the force transducer, the idle movement of the valve element exceeding the working stroke of the force transducer. This configuration makes it possible to render the working travel of the valve element greater and independent of the working stroke of the force transducer.

In an alternative further embodiment the actuator features as the force transmission member a follower configured in one piece together with the force transducer. This is a particularly cost-effective alternative of the valve assembly which is suitable especially when the casting material impacts the force transducer with little kinetic energy.

In still another preferred further embodiment both the valve piston as well as the working piston are each spring biased in the direction of the advanced open position, this enabling a more even force acting on the follower in the direction of the advanced open position.

In conclusion in one particularly preferred further embodiment of the valve assembly at least one pilot-actuated closing piston is provided by means of which the force transmission member and at least the valve piston coupled thereto are shiftable into the closing position. A configuration such as this has the advantage that closing the evacuation valve can also be freely timed by pilot actuation to any point in time. Closing the evacuation valve by pilot actuation is of use, for example, for test purposes, especially at the start of a casting action, namely until the temperatures of the various parts within the valve assembly have evened out.

DESCRIPTION OF THE FIGURES

The invention will now be detailed with reference to the drawings in which.

DETAILED DESCRIPTION

Figure 1:
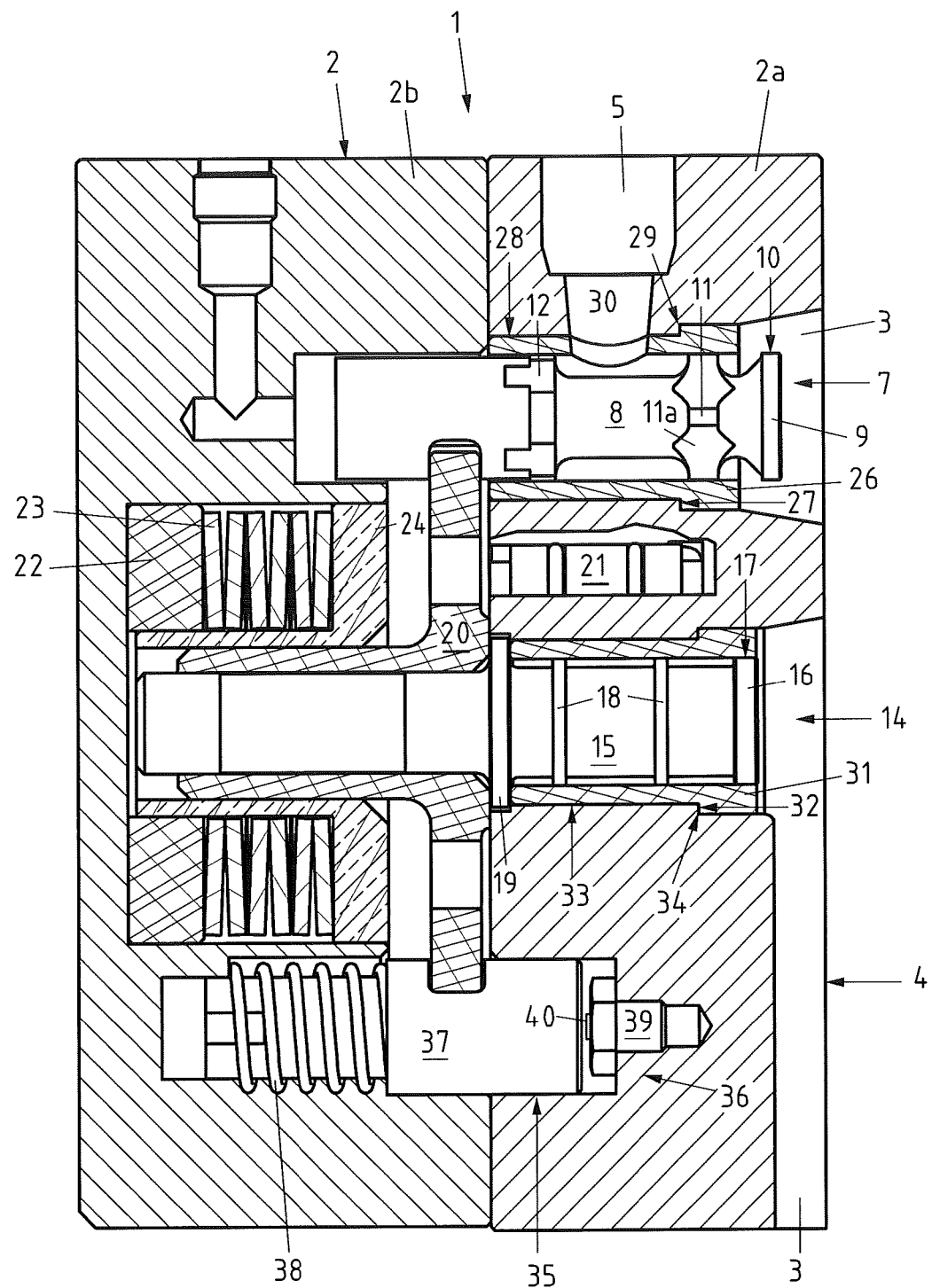
FIG. 1 is a section through a first example version of a valve assembly in accordance with the invention.

Referring now to FIG. 1 there is illustrated a section through a valve assembly 1 serving to evacuate die casting molds. Since the basic principle of such a valve assembly is known from EP 0 612 573 A1 the following is concentrated particularly only on the salient elements or parts as engineered in accordance with the invention.

The valve assembly 1 features a valve casing 2 comprising a front casing part 2a and a rear casing part 2b. The two casing parts 2a, 2b are joined together by fasteners (not shown) such as bolts. The valve casing 2 is provided with an evacuation duct consisting of an inlet duct 3 bottoming in the front casing part 2a and an outlet duct 5 leading upwards out of the front casing part 2a. The inlet duct 3 is connected to the mold cavity of the die casting mold to be evacuated, whilst the outlet duct 5 is usually connected to an exhaust device. Arranged in the valve casing 2 is an evacuation valve 7 by means of which the outlet duct 5 can be closed off from the inlet duct 3. In the direction of the front face 4 of the valve casing 2 the inlet duct 3 is open, a so-called compensator being applied to the front face 4. Not shown is how the compensator seals off the valve casing 2 to the front.

The evacuation valve 7 comprises a valve piston 8 which can be shifted via an actuator 14 between a front open position and a rear closing position. The actuator 14 comprises substantially a force transducer 15, a force transmission member in the form of a follower 20, a stationary pressure plate 22, a moving pressure plate 24, a stacked spring assembly 23 disposed between the two pressure plates 22, 24 as well as a pneumatic closing member 36. The follower 20 is penetrated by two tappets (not shown) serving to tension the stacked spring assembly 23. To start with, the tappets protrude from the front face 4 of the valve casing 2, they then being retracted on applying the compensator, thereby biasing the stacked spring assembly 23.

In addition, the actuator 14 may also comprise one or more pilot-actuated closing pistons 21, termed Vacustops, operating pneumatically which will be detailed further on. A single closing piston 21 as shown in FIG. 1 is only evident suggested. The cited closing piston 21 is pilot actuated, preferably, pneumatically, it serving at the start of the casting cycle to close the valve piston 8 in due time. An external signal is used to trigger the closing action.

The two casing parts 2a, 2b are made of a high-temperature material, preferably, steel, it being particularly preferred to manufacture the casing parts 2a, 2b from a hot worked steel such as for example 1.2343 ESU. To adapt the valve casing 2 at the locations exposed to high stress and strain, namely in the region of the valve piston 8 of the evacuation valve 7 as well as of the force transducer 15 of the actuator 14, to the specific requirements two sleeves 26, 31 are inserted in the front casing part 2a each of which enclose the head part 9, portions 16 of the valve piston 8 and force transducer 15 respectively. Both the first sleeve 26 and the further sleeve 31 are preferably made of a hard-wearing tool steel such as, for example, a cold-worked steel K340. In any case, the two sleeves 26, 31 are made of a material which is substantially harder as well as more resistant to abrasion, stress and strain than the two casing parts 2a, 2b.

Each sleeve 26, 31 is inserted in separate drilled holes 28, 33 machined in the front casing part 2a. To enable the sleeves 26, 31 to be precisely positioned axially, both drilled holes 28, 33 as well as both sleeves 26, 31 are each provided with a heel 27, 32 or step 29, 34 respectively. Due to the step 29, 34 of each drilled hole 28, 33 the diameter of the corresponding drilled holes 28, 33 becomes larger towards the front face 4. In other words each drilled hole 28, 33 becomes smaller in diameter in the direction of the rear casing part 2b, the cited step 29, 34 being formed at the transition from the larger to the smaller diameter at which each sleeve 26, 31 comes into contact with the heel 27, 32 corresponding to the step 29, 34. With such a configuration each sleeve 26, sleeve 31 must be pressed in from the front face 4 into the corresponding drilled hole 28, 33. When pressing in as cited the heel 27, 32 of each sleeve 26, sleeve 31 comes into contact with the step 29, 34 of the corresponding drilled holes 28, 33 as a result of which each sleeve 26, 31 is exactly positioned axially. At the same time this ensures that each sleeve 26, 31 cannot be further urged inwards in the direction of the rear casing part 2b in the valve casing 2 even when the front end directed at the front face 4 is subjected to forces. The reason for this being important is that when die casting the casting material—metal—impacts the front end of each sleeve 26, 31 with high kinetic energy from the inlet duct 3.

The sleeve 26 serving to guide the valve piston 8 is provided with a radial drilled hole 30 via which the interior of the sleeve 26 is connected to the outlet duct 5. The force transducer 15 is provided with a collar 19 to which the follower 20 comes into positive contact in the forward directed motion. Machined in the rear side of the front casing part 2a is a round recess to receive the collar 19 of the force transducer 15 in the forward shifted position as shown. The rear side of the sleeve 31 extends axially up to the cited recess in the front casing part 2a.

The front part of the valve piston 8 is provided with a front guide portion 11 and a rear guide portion 12 for guidance in the sleeve 26. The front guide portion 11 is provided with axially ports 11a. It is via these ports 11a that any gas involved is free to flow from the inlet duct 3 into the outlet duct 5 when the evacuation valve 7 is opened.

The valve piston 8 of the evacuation valve 7 depicted in the opened condition has a head part 9 with a cylindrical configured shell surface 10. The outer diameter of the head part 9 is exactly adapted to the inner diameter of the corresponding sleeve 26. The front face of this head part 9 translates sharp-edged into its shell surface 10 as will be detailed further on.

The force transducer 15 of the actuator 14 is composed of three cylindrical portions 16, 18 by means of which it is guided in the sleeve 31. The front portion 16 directed at the inlet duct 3 forms the header of the force transducer 15 which is provided with a cylindrical configured shell surface 17. The outer diameter of the front portion 16 is in turn exactly adapted to the inner diameter of the corresponding sleeve 31. The front face of this header likewise translates sharp-edged into the shell surface 17 of the front portion 16.

The term "sharp-edged" in the context of this example is to be understood that between the front face and the shell surface 10, 17 of the front part of the valve piston 8 and of the force transducer 15 respectively no appreciable chamfer or rounded edge is provided, it being obvious that "sharp-edged" does not mean an edge which is exactly sharp, but that to a certain degree a minor phase or small radius of, for example, a few tenths of a millimeter is possible. The difference between a sharp-edged transition and a chamfer consists of the fact that in the closed condition of the valve piston 8 and force transducer 15 respectively a molten casting material is unable to form an annular conical shell around the front end of the head part 9 or force transducer 15 respectively and the inner side of each sleeve 26, 31. Such an annular shell has, due to the small volume, a tendency to solidify very quickly. In addition to this with a chamfer there is the danger that the resulting annular shell, parts or particles thereof—particularly in a forward directed shifting movement of the valve piston 8 or force transducer 15 respectively—can clog up between each head part 9, 16 and the inner surface of each sleeve 26, 31 which, of course, is a disadvantage resulting in added wear and tear. This can be avoided by the cited sharp-edged configuration. It is particularly in conjunction with a hardened sleeve 26, 31 enclosing the head part 9, 16 that a sharp-edged configuration of each head part 9, 16 can be achieved, especially since the parts involved 9, 26; 16, 31 are dimensioned very exactly and can be adapted to each other.

The pneumatic closing member 36 of the actuator 14 features a working piston 37 accommodated in a drilled hole 35 of the valve casing 2 and which by means of a pressure spring 38 is biased in the direction of the front casing part 2a. By means of the pressure spring 38 the actuator 14 is thus maintained in the forward open position. In addition, the closing member 36 comprises an inlet nozzle 39 provided with a central air outlet (not shown). Arranged at the end face of the inlet nozzle 39 is a sealing member 40 surrounding the air outlet it being with this sealing member 40 that the working piston 37 comes into contact by its end face in the closing position. The task of this sealing member 40 is to ensure that in the forward position the working piston 37 comes sealingly into contact with the inlet nozzle 39, more particularly also when, for example, the drilled hole 35 is no longer symmetrical because of wear and tear, resulting in the end face of the working piston 37 having become somewhat skew.

The pneumatic closing member 36 serves particularly to maintain the valve piston 8 in the closing position as achieved by the momentum of the force transducer 15.

Since the function of the valve assembly is known from the patent EP 0 612 573 A1 as cited at the outset, the way it works is discussed only briefly in the following. With the evacuation valve 7 open any gas in the cavity of the die casting mold can be evacuated via the outlet duct 5 of the valve assembly, the gas streaming via the inlet duct 3 and the open evacuation valve 7 into the sleeve 26 where it gains access via the radial drilled hole 30 to the outlet duct 5 connected to an exhaust device (not shown). As soon as the cavity of the die casting mold is filled with casting material, the molten casting material escapes via the evacuation duct in gaining access via the inlet duct 3 to the valve assembly up to the force transducer 15. Due to the kinetic energy of the casting material now being forwarded at high velocity the force transducer 15 is abruptly retracted in the direction of the rear casing part 2b. Due to the collar 19 of the force transducer 15 coming into contact with the follower 20, the follower 20 is likewise retracted. In doing so, the follower 20 entrains simultaneously the valve piston 8 of the evacuation valve 7 as well as the working piston 37 of the pneumatic valve 36, thus shutting off the evacuation valve 7 so that no casting material can gain access to the outlet duct 5 or escape from the valve assembly 1.

The working stroke of the force transducer 15 is limited to a fraction of the working travel of the valve piston 8 of the evacuation valve 7 and of the actuator 14 respectively. Preferably, the working stroke of the force transducer 15 is limited to a third of the working travel at the most of the valve piston 8, this conversely meaning that the working travel of the valve piston 8 corresponding to at least 3 times the working stroke of the force transducer 15. Once the force transducer 15 has come into contact by its rear side with the rear casing part 2b the actuator 14 is free to be retracted until the corresponding elements come into contact at the each stop. The kinetic energy transmitted from the force transducer 15 to the elements of the actuator 14 is, in any case, sufficient to retract their elements, namely the follower 20 together with the valve piston 8 and the working piston 37 to their rear stops, the energy thereby transmitted, of course, being sufficient to overcome the force of the pressure spring 38. However, retraction of the actuator 14 is supported by the working piston 37 having been lifted from the inlet nozzle 39 and the compressed air streaming from the inlet nozzle 39 into the drilled hole 35, retracting the working piston 37. But the primary task of the closing member 36 is to maintain the actuator 14 in the rear closing position. For this purpose the closing member 36 is dimensioned so that the pressure acting on the end of the working piston 37 suffices to maintain the working piston 37 and thus the whole actuator 14 in the rear closing position in overcoming the force of the pressure spring 38.

On completion of the casting action the compensator (not shown) is removed from the front face 4, releasing the tappets (not shown) as a result of which the stacked spring assembly 23 is free to relax. The stacked spring assembly 23 then urges the movable pressure plate 24 against the follower 20 which in its turn urges the valve piston 8, the force transducer 15 and the working piston 37 forward in the direction of the front face 4. In this action the valve piston 8 and the force transducer 15 urge the solidified casting mass—riser—within the valve casing 2 in the inlet duct 3 and eject this forward out of the valve casing 2. The stacked spring assembly 23 serves in this action to retract the actuator 14 as well as to eject the solidified casting mass.

Ejecting the solidified casting mass is promoted by the sharp edged configuration of the valve piston 8 and of the force transducer 15 since in the forward directed closing member of the valve piston 8 or force transducer 15 respectively the casting mass, solidified and possibly located in the corresponding sleeve, is totally removed. Since both the valve piston 8 as well as the sleeve 26 are made of a very hard material and the outer diameter of the valve piston 8 and the outer diameter of the head part 9 of the valve piston 8 exactly matches the inner diameter of the corresponding sleeve 26, namely by being just a few hundredths of a millimeter smaller whilst also the end face of the head part 9 translates sharp-edged into the shell surface 10, even small and smallest metal debris can be also especially removed from the sleeve 26. The same applies to the force transducer 15 with the associated sleeve 31.

Alternatively or in addition the force transducer 15 can be dimensioned and adapted to the sleeve 31 such that the end face of the force transducer 15 in the retracted condition projects by 0.01 to 1 mm beyond the force transducer of the corresponding sleeve 31 directed at the front face 4 of the valve casing 2 in effectively enabling preventing any casting mass at all from gaining access into the sleeve 31. The same applies to the valve piston 8 by it being so dimensioned and adapted to the sleeve 26 that the head part 9 thereof in the retracted condition projects approx. 0.01 to 1 mm beyond the end face of the corresponding sleeve 26 directed to the front face 4 of the valve casing 2.

Figure 2:
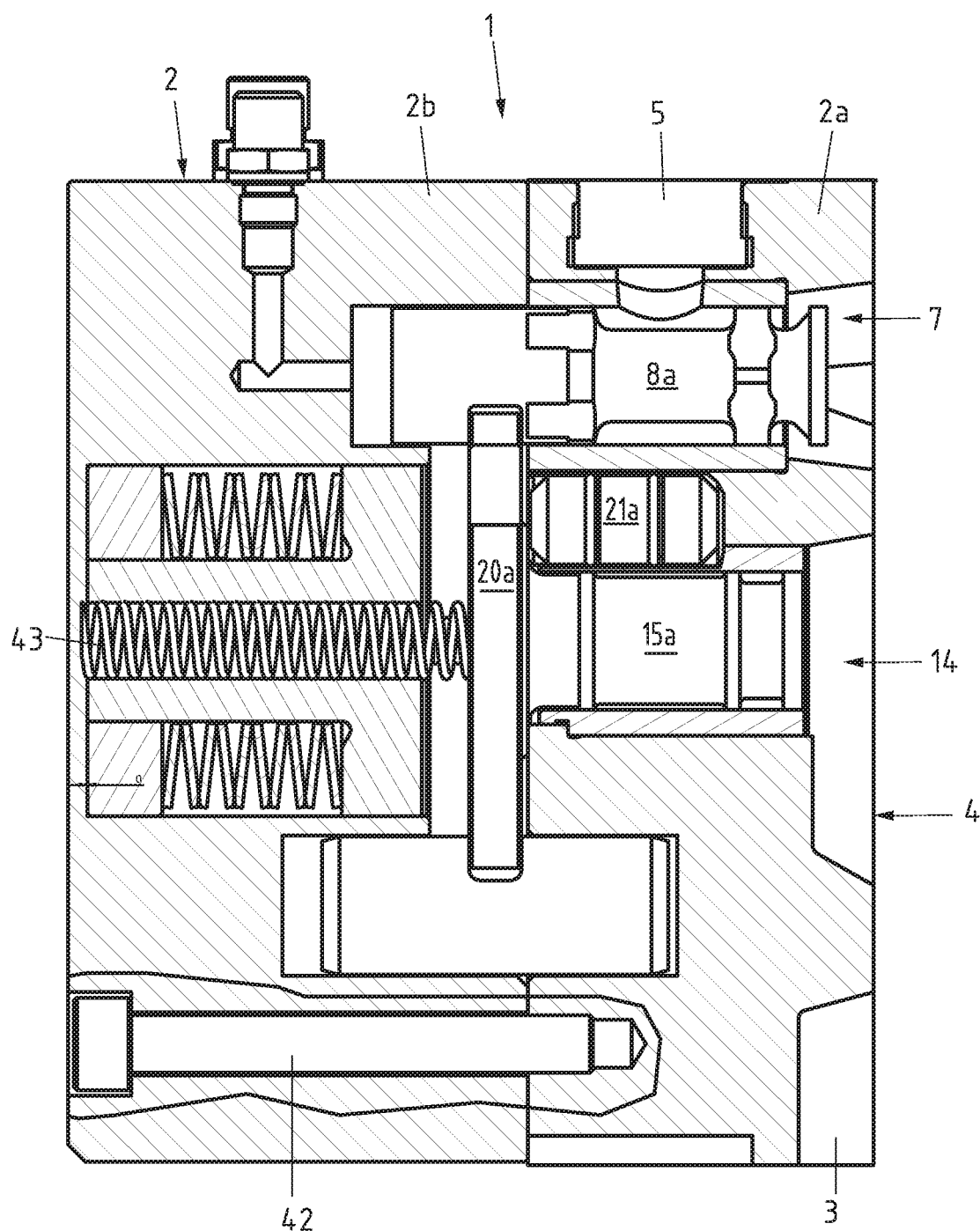
FIG. 2 is a section through a second example version of a valve assembly in accordance with the invention

Referring now to FIG. 2 there is illustrated a section through a second example version of a valve assembly, whereby the following comments detail in particular only the differences as compared to the example version described above. Thus, the salient difference to the example version as described above is that the force transducer 15a and the follower 20a do not form separate components, but instead are made in one piece. The follower 20a also comprises no rearwards projection, instead supported on the rear side of the follower 20a is a pressure spring 43 acting as a return spring serving to return the actuator 14 into the advanced open position. In addition, a closing piston 21a is evident by means of which the follower 20a can be retracted. Retracting the follower 20a also results in the evacuation valve 7 coupled thereto being closed. Preferably, two closing pistons 21a are provided which are arranged for example horizontally in line or diagonally opposed to each other, whereby in the illustration only one closing piston 21a is evident. The closing piston 21a is actuated piloted, preferably, pneumatically in serving at the start of the casting cycle to close the valve piston 8a in due time so that no casting mass can gain access to the outlet duct 5. The pneumatic passageways or ducts via which the end face of the closing piston 21a facing the front face 4 can be pneumatically actuated are not shown in this Fig. As already mentioned above the closing piston(s) 21a serve/serves to close the valve piston 8a in due time at the start of a casting cycle. But in any case, the valve piston 8a needs to be closed before the casting material gains access into the inlet duct 3. As soon as after a few casting actions the temperatures within the valve assembly have settled down, closing the valve piston 8a of the evacuation valve 7 via the casting mass impacting the force transducer 15a can occur. Experience has verified that after approx. 10 to 50 casting actions, closing the evacuation valve 7 can be done as actuated by the casting mass. In conclusion mention is to be made to a bolt 42 by means of which the two casing parts 2a, 2b are fastened together, it being obvious that several such bolts 42 may be put to use.

Figure 3:
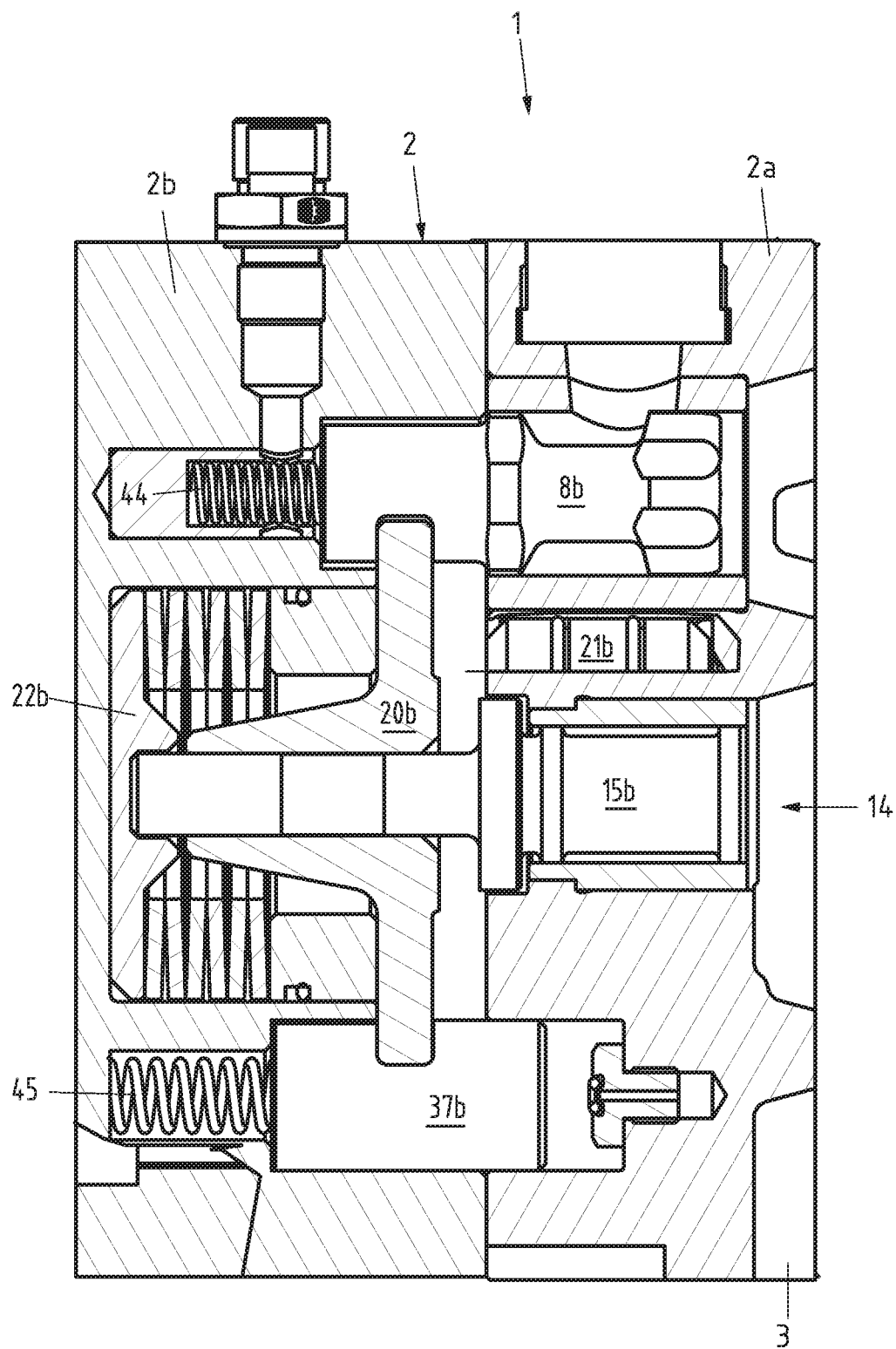
FIG. 3 is a section through a third example version of a valve assembly in accordance with the invention

Referring now to FIG. 3 there is illustrated a section through a third example version of a valve assembly wherein here too, particular attention is given to the differences as compared to the first example version. One salient difference to the example version as shown in FIG. 1 is that both the valve piston 8b and the working piston 37b are each biased by a pressure spring 44, 45 in the direction of the advanced open position. In addition, also provided in this case is at least one closing piston 21b by means of which of which the follower 20b can be retracted. The rear part of the follower 20b is formed by a conical protuberance. The resting pressure plate 22b is provided with a round recess in which the force transducer 15b is guided by its rear end. Since the valve piston 8b and the working piston 37b is each biased by a pressure spring 44, 45 in direction, a more even force impact of the follower 20 forward is achieved.

It is understood that some features of the example variants as shown in FIGS. 1 to 3 can be combined, where necessary. Mention is made in this respect that, for example, also in the example version as shown in FIG. 1 the valve piston 8b and the working piston 37b could each be biased by a pressure spring in the direction of the advanced open position.

The salient advantages afforded by the valve assembly as shown can be summarized as follows:

Making use of hardened sleeves enables the valve assembly to be configured particularly hard-wearing at the locations subjected to high stress and strain and nevertheless are cost-effective in production.

The valve assembly permits safe and reliable evacuation until the mold cavity is totally filled.

The valve assembly has a simple configuration and is engineered for a long life.

Items exposed to wear such as, for example, the two sleeves, the two pressure plates as well as the valve piston and the force transducer can be replaced new both quickly and simply, if required.

By providing one or more pilot-actuated closing pistons it can now be assured that the valve piston is closed in due time also at the start of the casting cycle so that no casting material can gain access into the outlet duct.

What is claimed is:

1. A die casting mold evacuation valve assembly comprising:

a valve casing including a front casing part and a rear casing part, whereby machined in the front casing part is an evacuation duct closable by means of an evacuation valve;

an actuator for actuating a valve piston of the evacuation valve, the actuator including a casting material actuated force transducer and a force transmission member for transmitting a closing movement of the force transducer to the valve piston of the evacuation valve; and a stacked spring assembly for returning the actuator and/or for ejecting a riser, wherein the front casing part is provided with a sleeve surrounding at least a head part of the valve piston and/or a further sleeve surrounding at least a head part of the force transducer, each sleeve being harder than the front casing part.

2. The valve assembly as set forth in claim 1, wherein said sleeve and/or said further sleeve is inserted in a hole drilled in the front casing part, each hole having a diminished diameter in a direction of the rear casing part, a transition from the larger to the small diameter forming a step for coming into contact with each sleeve with a heel corresponding to the step.

3. The valve assembly as set forth in claim 1, wherein the head part of the force transducer is configured cylindrical, an end face of the head part translating sharp edged into a shell surface area.

4. The valve assembly as set forth in claim 1, wherein the valve piston of the evacuation valve includes at a front end a cylindrical head part, the end face of which translates sharp edged into a shell surface area thereof.

5. The valve assembly as set forth in claim 1, wherein said sleeve and/or said further sleeve as well as the evacuation duct are arranged in the front casing part.

6. The valve assembly as set forth in claim 1, wherein the actuator as the force transmission member includes a follower disposed between the stacked spring assembly and a collar of the force transducer.

7. The valve assembly as set forth in claim 1, wherein the actuator is provided with a moving pressure plate mounting the stacked spring assembly for returning the actuator and/or ejecting a riser.

8. The valve assembly as set forth in claim 1, wherein the actuator includes a pneumatic closing member including a working piston accommodated in a hole drilled in the casing to which an inlet nozzle including a central air outlet and, surrounding the air outlet, a sealing member which by its end face comes into contact with the working piston in a closing position.

9. The valve assembly as set forth in claim 1, wherein the force transducer in addition to the cylindrical head part includes at least two further cylindrical portions, both of which are guided in the sleeve.

10. The valve assembly as set forth in claim 1, wherein the end face of the valve piston and/or of the force transducer when retracted projects by 0.01 to 1 mm from an end face of the corresponding sleeve facing a front face of the casing.

11. The valve assembly as set forth in claim 1, wherein the sleeve serving to guide the valve piston is provided with a radial drilled hole via which the interior of the sleeve is connected to the evacuation duct and the valve piston includes two guide portions, one of said guide portions arranged upstream of the radial drilled hole and the other of said guide portions arranged downstream of the radial drilled hole and wherein the guide portion arranged upstream of the radial drilled hole includes axial ports.

12. The valve assembly as set forth in claim 1, wherein a working stroke of the force transducer is limited to less than 2 mm.

13. The valve assembly as set forth in claim 12, wherein a working stroke of the valve piston corresponds to at least 3-times the working stroke of the force transducer.

14. The valve assembly as set forth in claim 1, wherein the actuator includes as the force transmission member a follower configured in one piece together with the force transducer.

15. The valve assembly as set forth in claim 1, wherein both the valve piston as well as the working piston are each spring biased by a pressure spring in the direction of an advanced open position.

16. The valve assembly as set forth in claim 1, further including at least one pilot-actuated closing piston coupled to the force transmission member and to at least the valve piston and operable to shift the force transmission member and valve piston into a closing position.

* * * * *